United States Patent
Zhao et al.

(10) Patent No.: US 10,972,801 B2
(45) Date of Patent: Apr. 6, 2021

(54) ELECTRONIC APPARATUS, METHOD AND PROGRAM FOR SELECTING CONTENT BASED ON TIME OF DAY

(71) Applicant: ARRIS Enterprises LLC, Suwanee, GA (US)

(72) Inventors: Xuewei Zhao, Shanghai (CN); Qiang Huang, Shanghai (CN); Biao Liu, Shanghia (CN); Haiting Feng, Shanghai (CN); Qiongbo Liu, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/551,540

(22) PCT Filed: Dec. 21, 2016

(86) PCT No.: PCT/CN2016/111292
§ 371 (c)(1),
(2) Date: Aug. 16, 2017

(87) PCT Pub. No.: WO2018/112791
PCT Pub. Date: Jun. 28, 2018

(65) Prior Publication Data
US 2019/0320233 A1 Oct. 17, 2019

(51) Int. Cl.
*H04N 21/442* (2011.01)
*H04N 21/482* (2011.01)
*H04N 21/418* (2011.01)

(52) U.S. Cl.
CPC ....... *H04N 21/482* (2013.01); *H04N 21/4181* (2013.01); *H04N 21/4182* (2013.01); *H04N 21/442* (2013.01)

(58) Field of Classification Search
CPC ............ H04N 21/4181; H04N 21/4182; H04N 21/441; H04N 21/44204; H04N 21/44222
(Continued)

(56) References Cited

U.S. PATENT DOCUMENTS

2004/0221304 A1* 11/2004 Sparrell ........... H04N 21/43622
725/34
2006/0048184 A1*  3/2006 Poslinski ........... H04N 5/44543
725/45
(Continued)

FOREIGN PATENT DOCUMENTS

| CN | 101699852 A | 4/2010 |
|---|---|---|
| CN | 104363487 A | 2/2015 |

(Continued)

OTHER PUBLICATIONS

PCT International Search Report & Written Opinion, Re: Application No. PCT/CN2016/111292, dated Sep. 21, 2017.
(Continued)

*Primary Examiner* — Dominic D Saltarelli
(74) *Attorney, Agent, or Firm* — Wenderoth, Lind & Ponack L.L.P.

(57) ABSTRACT

An electronic apparatus including a control circuit that controls access to content and determines an operation mode of the electronic apparatus, and a monitoring circuit that monitors the access to the content, acquires content access information, and generates a table. The control circuit causes each of the content access information acquired by the monitoring circuit and the table generated by the monitoring circuit to be stored in a non-transitory computer-readable recording medium of the electronic apparatus. The monitoring circuit can update the content access parameters as additional content access information is acquired, and when the control circuit determines that the electronic apparatus is in an active mode, the control circuit can refer to the table
(Continued)

and select, when access parameters of the active mode match the updated content access parameters, a current content to be output from the electronic apparatus.

18 Claims, 6 Drawing Sheets

(58) Field of Classification Search
USPC .......................................... 725/9, 25, 27, 29
See application file for complete search history.

(56) References Cited

U.S. PATENT DOCUMENTS

| | | | |
|---|---|---|---|
| 2013/0179698 A1 | 7/2013 | Woods et al. | |
| 2013/0205312 A1* | 8/2013 | Huang | H04N 21/482 |
| | | | 725/11 |
| 2014/0047467 A1 | 2/2014 | Arling et al. | |
| 2014/0344850 A1* | 11/2014 | Wajs | H04N 21/26606 |
| | | | 725/31 |
| 2015/0208123 A1* | 7/2015 | Shintani | H04N 21/439 |
| | | | 725/110 |
| 2017/0257660 A1* | 9/2017 | Liu | G06F 3/002 |
| 2018/0063596 A1* | 3/2018 | Joglekar | H04N 21/6582 |
| 2018/0199098 A1* | 7/2018 | Jang | H04N 21/4668 |

FOREIGN PATENT DOCUMENTS

| | | |
|---|---|---|
| CN | 104717560 A | 6/2015 |
| CN | 105187916 A | 12/2015 |

OTHER PUBLICATIONS

Office Action dated Jul. 23, 2020 in Canadian Application No. 3,047,655.

* cited by examiner

| DAY | START TIME | END TIME | CHANNEL/SERVICE |
|---|---|---|---|
| SUNDAY | 9:00 AM | 9:30 AM | 5 |
| ... | ... | ... | ... |
| MONDAY | 4:00 PM | 5:00 PM | VOD |
| ... | ... | ... | ... |
| TUESDAY | 4:00 PM | 5:00 PM | VOD |
| ... | ... | ... | ... |

FIG. 5

| DAY | CHANNEL/SERVICE | START TIME | END TIME | DURATION(MINUTES) |
|---|---|---|---|---|
| FIRST SUNDAY | 5 | 9:00 AM | 9:07 AM | 7 |
| | 100 | 9:07 AM | 9:10 AM | 3 |
| | 5 | 9:10 AM | 9:20 AM | 10 |
| | 30 | 9:20 AM | 9:23 AM | 3 |
| | 5 | 9:23 AM | 9:30 AM | 7 |
| | | | CHANNEL/SERVICE | TOTAL DURATION(MINUTES) |
| | | | 5 | 24 |
| | | | 30 | 3 |
| | | | 100 | 3 |

FIG. 6A

| DAY | CHANNEL/SERVICE | START TIME | END TIME | DURATION (MINUTES) |
|---|---|---|---|---|
| SECOND SUNDAY | 5 | 9:00 AM | 9:08 AM | 8 |
| | 60 | 9:08 AM | 9:10 AM | 2 |
| | 5 | 9:10 AM | 9:21 AM | 11 |
| | 50 | 9:21 AM | 9:23 AM | 2 |
| | 5 | 9:23 AM | 9:30 AM | 7 |
| | | | CHANNEL/SERVICE | TOTAL DURATION(MINUTES) |
| | | | 5 | 26 |
| | | | 50 | 2 |
| | | | 60 | 2 |

FIG. 6B

| DAY | START TIME | END TIME | CHANNEL/SERVICE | TOTAL DURATION (MINUTES) |
|---|---|---|---|---|
| SUNDAY | 9:00 AM | 9:30 AM | 5 | 50 |
| | | | 30 | 3 |
| | | | 50 | 2 |
| | | | 60 | 2 |
| | | | 100 | 3 |

FIG. 6C

ELECTRONIC APPARATUS, METHOD AND PROGRAM FOR SELECTING CONTENT BASED ON TIME OF DAY

BACKGROUND

Electronics manufacturers, cable service providers, and multiple system operators (MSOs) strive to provide products that are convenient for customers to use. Convenient features can differentiate products on the market and drive demand for products of a certain manufacturer.

A popular electronic apparatus in many homes is the so-called "set-top-box," which houses electronic circuits that convert signals from an input line into signals usable by consumer devices for displaying data and audio/video media content such as television programming and movies.

The types of consumer devices being served by set-top-boxes will become more varied, including not only televisions, but computers, and portable devices such as electronic tablets and smart phones, and wearable electronics such as smart watches. The input signals can be provided by service providers including cable television providers, satellite television providers, internet service providers, and multiple system operators. The set-top-box can be connected to consumer devices by HDMI® or the like, and make use of features such as HDMI-CEC.

In addition to being provided in the self contained set-top-box configuration, the electronics can be integrated directly into the consumer device, such as being built into a television. For ease of discussion, the set-top-box configuration will be referred to hereafter, but the invention is not intended to be limited only to set-top-boxes, and can be utilized on any type of consumer electronic device that displays data and audio/video media content such as television programming and movies.

To determine convenient features for use of a set-top-box, it is necessary to analyze a user's interaction with and usage of the set-top-box.

In addition to basic cable television functions and/or Internet Protocol Television (IPTV) functions, the set-top-boxes disclosed herein may include computer network connectivity functions, including Local Area Network (LAN) interfaces, and Wireless Local Area Network (WLAN) interfaces which use wireless signals, such as Wi-Fi or in-home LTE (Long Term Evolution) technology, or the like.

For ease of installation and maximization of potential locations in the home, the set-top-boxes disclosed herein are not required to be connected to the home network via a wired connection, but rather may exclusively use a Wi-Fi connection.

The set-top-box can provide access to content broadcast on a broadcast channel, content provided through an over-the-top (OTT) service, content provided through a pay-per-view service, and content provided through a video-on-demand service.

The set-top-boxes disclosed herein may include applications that provide access to additional media content or media services. An example of such an application and/or media service includes Netflix®, or the like.

Service providers typically utilize an Electronic Program Guide (EPG) for presenting channel information to users. An EPG is an on-screen guide to a broadcast schedule for television programs. A user can navigate and select content to watch by categories including but not limited to channel, time, and title, by use of a remote control, a keyboard, or other input devices (e.g., mobile devices such as smart phones and tablets).

An EPG typically includes a Graphical User Interface (GUI) for displaying program start/end times, channel identification, alternative program accessibility (e.g., from Pay-Per-View (PPV) and/or Video On-Demand (VOD) services) and other descriptive information. EPGs are typically sent within a transport stream of a television station or in a dedicated data channel.

The Program and System Information Protocol (PSIP) publishes information about television programs so that users can select what to watch by title and description. Included in the PSIP are tables that contain information such as program start time, title, and so on and so forth. For example, an event information table (EIT) includes titles and program guide data.

The Advanced Television Systems Committee (ATSC) standard for Digital Television (DTV) uses such tables. A channel service database in a set-top-box can store EPG information.

It has been found by the inventors that a user frequently watches the same content at a particular time of day. For example, a user in a household may normally watch a particular sports channel from 9:00 AM to 12:00 PM on every Saturday morning, but watch a particular news channel from 7:00 PM to 8:00 PM in the evening every day of the work week.

However, the set-top-box frequently is not set to display the channel that the user normally watches at the same time each day, because the set-top-box tunes to a default channel, or, for example, is simply left on the channel that was most recently watched, which may be different than a channel that is normally watched at a particular time of day.

For example, at 7:00 PM on Monday through Friday, the user tunes the set-top-box to a particular news channel, such as the user's favorite news channel. When a user intends to watch the favorite news channel at the normal viewing time of 7:00 PM, the user typically has to manually tune to the favorite news channel, which is inconvenient for the user.

Additionally, instead of tuning to a particular channel, a user may instead use a particular video service or video streaming application included with the set-top-box at the same time every day. For example, every day at 4:00 PM on Monday through Friday, children's programming that is provided through a VOD service of the set-top-box is watched. However, the user must manually open the VOD service to begin watching the content of the VOD service.

Because of these drawbacks of existing technologies, there is a need to automatically display content that is viewed at the same time each day, without requiring the user to manually tune to a particular channel, manually open an application, or manually use a service such as the VOD service of the set-top-box.

SUMMARY OF THE INVENTION

The present application discloses an electronic apparatus, method and program for selecting content based on the time of day.

The electronic apparatus can be used with a separate electronic device, such as a display device (e.g., a television). The electronic apparatus can include: a control circuit that controls access to content provided by the electronic apparatus and determines an operation mode of the electronic apparatus; a monitoring circuit that monitors the access to the content; acquires content access information associated with (i) the content and (ii) the access to the content; and generates a table, the table including content access parameters of the content access information. The electronic apparatus can also include a non-transitory computer-readable recording medium, wherein the control circuit causes each of the content access information acquired by the monitoring circuit and the table generated by the monitoring circuit to be stored in the non-transitory computer-readable recording medium.

The monitoring circuit can update the content access parameters in the table as additional content access information is acquired by the monitoring circuit, and when the control circuit determines that a current operation mode of the electronic apparatus is an active mode, the control circuit can refer to the table and select, when access parameters of the active mode are determined by the control circuit to match the updated content access parameters, a current content to be output from the electronic apparatus.

The current content can include at least one of: content broadcast on a broadcast channel; content provided through an over-the-top service; content provided through a pay-per-view service; and content provided through a video-on-demand service.

The electronic apparatus can be connected to a display device, and the display device can be configured to display the current content to be output from the electronic apparatus. In the active mode, each of the electronic apparatus and the display device is in a power-on state.

The updated content access parameters can include at least one of: a start time of the access to the content; an end time of the access to the content; a day of the week associated with the access to the content; and channel/service identification information corresponding to the content.

The access parameters of the active mode can be determined by the control circuit to match the updated content access parameters when (i) a time at which the control circuit determines that the current operation mode is the active mode overlaps with the start time of the access to the content, and (ii) a day of the week associated with the time at which the control circuit determines that the current operation mode is the active mode is the same as the day of the week associated with the access to the content.

The broadcast channel can include a plurality of channels, and the plurality of channels can include over-the-air broadcast channels and/or channels provided by a content provider.

The monitoring circuit can calculate a total access duration of access to each of the plurality of channels, the control circuit can cause the calculated total access durations to be stored in the table, and the control circuit can select a channel of the plurality of channels that has a longest total access duration among the calculated total access durations stored in the table, to output content of the selected channel as the current content.

The monitoring circuit does not have to be operated if the operation mode of the electronic apparatus is determined by the control circuit to be one of: an off mode different from the active mode; an inactive mode different from each of the active mode and the off mode; and an other input mode different from each of the active mode, the off mode, and the inactive mode.

The method, program, or algorithm for selecting content in an electronic apparatus can include: determining access to content provided by the electronic apparatus; determining an operation mode of the electronic apparatus; monitoring the access to the content; acquiring content access information associated with (i) the content and (ii) the access to the content; generating a table, the table including content access parameters of the content access information; storing, in a non-transitory computer-readable recording medium of the electronic apparatus, the acquired content access information and the generated table; updating the content access parameters in the table as additional content access information is acquired; and when, in the determining the operation mode of the electronic apparatus, a current operation mode is determined to be an active mode of the electronic apparatus.

The method, program, or algorithm can also include: connecting the electronic apparatus to a display device; displaying, on the display device, the current content; calculating a total access duration of access to each of the plurality of channels; storing, in the table, the total access durations; selecting a channel of the plurality of channels that has a longest total access duration among the total access durations stored in the table; and outputting content of the selected channel as the current content.

The user can choose, for example, to activate the content selection feature (i.e., a favorite channel feature) of the set-top-box, thus authorizing the set-top-box to begin monitoring the usage of the set-top-box, or the box can be preset to provide such functionality.

With the present invention, since the channel is automatically tuned to the channel that is normally watched by a user at the particular time of day (i.e., a favorite channel); user convenience is increased, as the user does not have to manually tune to the desired channel. Likewise a service that is normally used by a user at the particular time of day (i.e., a favorite service) can be automatically launched, so that the user does not have to manually open the service.

DETAILED DESCRIPTION

Figure 1:
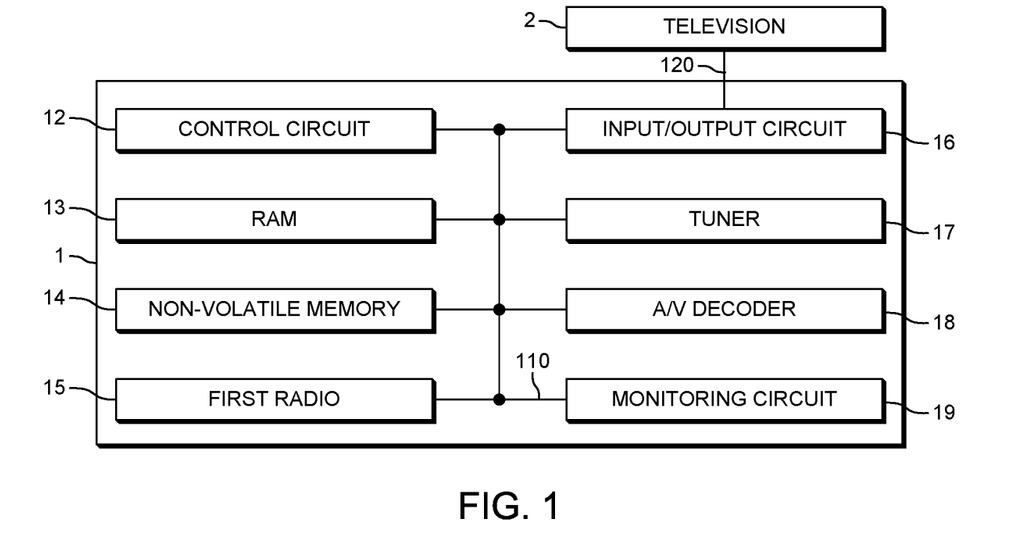
FIG. 1 is a block diagram of an electronic apparatus according to the present invention.

An electronic apparatus according to the present invention, e.g., a set-top-box 1, is shown in FIG. 1. The electronic apparatus includes circuitry by which the electronic apparatus can control access to and display of content. For ease of discussion, the electronic device will be explained in the configuration of a set-top-box hereafter, but the invention is not intended to be limited only to set-top-boxes and can alternatively be integrated directly into a consumer device such as a display device (e.g., television), computer, or any other consumer device, such as electronically equipped appliances.

The set-top-box 1 includes bus lines 110 through which various circuits are connected and communicate data with each other. A control circuit 12, which can be a dedicated control circuit, CPU, microprocessor, etc., controls the circuits of the set-top-box 1. A RAM 13 can be provided as a working memory for the control circuit 12, and a non-volatile memory 14 can be provided for storage of program code, and user Audio/Video (A/V) content and other data.

A first radio 15, such as a Wi-Fi WLAN interface radio transceiver, or an in-home LTE (Long Term Evolution) transceiver outputs the signal of the selected channel to a wireless user device. The wireless output by the first radio 15 can be in place of or in addition to the wired output by an input/output circuit 16. The set-top-box 1 can output the signals of respective selected channels to plural devices simultaneously, and otherwise wirelessly communicate with the plural devices simultaneously. Also, the set-top-box can access Internet Protocol Television (IPTV) and/or internet-based media video services such as Netflix® by way of connecting the set-top-box 1 to the internet using an internet connection provided by the first radio 15.

The first radio 15 also receives command and control messages, including code downloads and software updates, sent from the service provider.

The set-top-box 1 may include the input/output circuit 16, which can include one or more connectors, such as RF connectors or Ethernet connectors. One of the connectors of the input/output circuit 16 can be connected to a content provider, such as a multiple system operator (MSO), by terrestrial antenna, satellite dish, or wired cable. Through the input/output circuit 16, the set-top-box 1 receives an input signal, including data and/or A/V content, from the content provider and can send data to the provider.

The set-top-box 1 can function as a gateway, maintaining communication with the content provider, for example via a DOCSIS (Data Over Cable Service Interface Specification) connection.

The set-top box 1 can include a tuner 17 to select a desired channel from the input signal based on an input instruction by the user either through a button or buttons (not shown) on the set-top-box, via a remote control (not shown) of the set-top-box, or via a user device (not shown) such as a computer, electronic tablet device, or mobile phone. Channel information can be retrieved from an EPG (not shown) of the set-top-box 1.

In order to allow an installation of the set-top-box 1 in a manner in which no physical cable input is required, the input signal from the service provider can be received by a separate electronic device, such as a cable modem, or a different set-top-box, and the signal can be communicated to the set-top-box 1 wirelessly via the first radio 15. In such a scenario, the set-top-box 1 could be provided without the input/output circuit 16. Also, the set-top-box 1 can provide the content according to IPTV, in which can the tuner 17 may be omitted as well.

The signal of the selected channel is decoded by an A/V decoder 18. The input/output circuit 16 can also include a connector 120 that is to be connected to the user's content playing device, such as a television 2, for displaying audio-video content received by the set-top-box 1 and decoded by the A/V decoder 18.

The set-top box 1 can include a monitoring circuit 19, which can monitor the usage of the set-top-box 1. For example, the monitoring circuit 19 can monitor and acquire information pertaining to the time and day that certain channels are viewed and/or when services such as VOD are used. A table can be generated by the monitoring circuit 19 that stores such information. The information in this table can be updated as the watching habits of a user are monitored during everyday usage of the set-top-box 1. The table is stored in a channel service database of the set-top-box 1.

The control circuit 12 of the set-top-box 1 controls the components of the set-top-box 1 to implement and/or detect different operational states of the set-top-box 1 and other electronic devices connected thereto. Such operational states include a power-on state in which the set-top-box 1 is turned on, a power saving state (also referred to as a sleep state) of the set-top-box 1, and a power-off state in which the set-top-box 1 is off.

The control circuit 12 of the set-top-box 1 also detects connection scenarios based on the status of the set-top-box 1 and, for example, a television 2 connected to the set-top-box 1. These connection scenarios are characterized as different operation modes. The operation modes can be used to determine if usage of the set-top-box 1 should monitored by the monitoring circuit 19.

An Off mode is designated when the set-top-box 1 is determined, by the control circuit 12, to be in either of the sleep state or the power-off state.

An Inactive mode is designated when the set-top-box 1 is determined, by the control circuit 12, to be powered on, but the television 2 connected to the set-top-box 1 is determined, by the control circuit 12, to be powered off (i.e., in the power-off state). In this case, it is assumed that the set-top-box 1 is not being actively used/watched, as the television 2 connected to the set-top-box 1 is off.

An Other Input mode is designated when the set-top box 1 is determined, by the control circuit 12, to be powered on, but is not being actively used by a user. In this case, the television 2 that is connected to the set-top box 1 is determined, by the control circuit 12, to be set to an A/V input different than an A/V input associated with the set-top-box 1, and thus it is assumed that the user is not using the set-top-box 1 (even though the set-top-box 1 is in the power-on state).

For example, when the television 2 is switched to a different A/V input, the set-top-box 1 receives, via the connector 120 connected to the input/output circuit 16, a disconnect signal from the television 2 to indicate the switching of the television 2 to an A/V input different than an A/V input associated with the set-top-box 1.

Such a disconnect signal can be transmitted by way of a communication protocol such as HDMI-CEC, or by any other communication protocol (e.g., Wi-Fi, Bluetooth™ or the like) utilized between the set-top-box 1 and the television 2.

An Active mode is designated when both the set-top-box 1 and the television 2 connected to the set-top-box 1 are determined, by the control circuit 12, to be powered on (i.e., in the power-on state).

The control circuit 12 will refrain from transmitting a control signal to the monitoring circuit 19 to begin monitoring usage of the set-top-box 1 if the set-top-box 1 is determined to be off (i.e., the operation mode is the Off mode), thereby avoiding unnecessary operation of the monitoring circuit 19.

In the Inactive mode, the control circuit 12 detects the scenario in which the set-top-box 1 is powered on, but the television 2 connected to the set-top-box 1 is not powered on. In such a scenario, the control circuit 12 may refrain from transmitting a control signal to the monitoring circuit 19 to begin monitoring usage of the set-top-box 1. That is, in the scenario where the set-top-box 1 may be left in a powered on state by a user, but the set-top-box 1 is not being actively watched, information of the usage of the set-top-box 1 during such a scenario will not be monitored and stored, since it is assumed that the user is not actually viewing content at that time. By avoiding the monitoring and storing of such information in such a scenario, the table is not populated with invalid or inaccurate information (e.g., false positive information).

The monitoring and acquiring of information pertaining to the usage of the set-top-box 1 by the monitoring circuit 19 begins when the control circuit 12 detects that each of the set-top-box 1 and the television 2 is on, otherwise known as the Active mode.

Once the operation mode is determined to be the Active mode, the control circuit 12 sends a control signal, using bus lines 110, to the monitoring circuit 19 to begin monitoring usage of the set-top-box 1.

In the Active mode, the monitoring circuit 19 monitors a usage of the set-top-box 1, and stores data, in the form of content access information, in a table in a memory of the set-top-box 1. The memory can be RAM 13 or non-volatile memory 14, a separate flash-type memory of the set-top-box 1, or in the form of cloud storage accessible to the set-top-box 1, or any future storage medium. The table is stored in a channel service database stored in the memory of the set-top-box 1.

Figure 2:
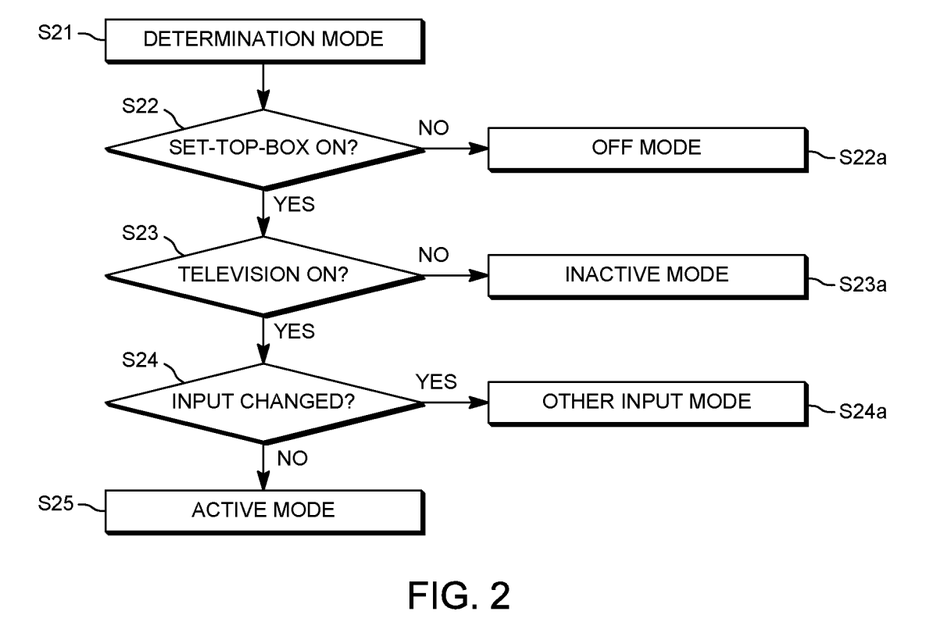
FIG. 2 is a flow chart of an algorithm implemented by the electronic apparatus for determining an operation mode of the electronic apparatus.

FIG. 2 is a flowchart of an example of a determination mode for determining the above-described operation modes.

In step S21, the control circuit 12 initiates a determination mode, wherein the status of each the set-top-box 1 and the television 2 connected thereto is acquired. The determination mode may run periodically in any of the above-noted operational states of the set-top-box 1, as needed.

In step S22, the control circuit 12 determines if the set-top-box 1 is powered on. If the control circuit 12 determines in step S22 that the set-top-box 1 is not powered on, the control circuit 12 does not send a control signal to the monitoring circuit 19 to begin monitoring, and it is determined in step S22a that the current mode is the Off mode.

If the control circuit 12 determines in step S22 that the set-top-box 1 is powered on, the control circuit 12 in step S23 polls (e.g., via input/output circuit 16 and connector 120) the television 2, to determine the operational state of the television 2. If the control circuit 12 determines in step S23 that the television 2 is not powered on, the control circuit 12 does not send a control signal to the monitoring circuit 19 to begin monitoring, and it is determined in step S23a that the current mode is the Inactive mode.

If the control circuit 12 determines in step S23 that the television 2 is powered on, the control circuit 12 in step S24 polls the television 2 to determine the A/V input status of the television 2. Based on communication signals received from the television 2 via connector 120 connected to the input/output circuit 16, if the control circuit 12 determines in step S24 that the television 2 is not set to an A/V input of the set-top-box 1, the control circuit 12 does not send a control signal to the monitoring circuit 19 to begin monitoring, and it is determined in step S24a that the current mode is the Other Input mode.

If the control circuit 12 determines in step S24 that the A/V input of the television 2 is set to the set-top-box 1, it is determined that the current mode is the Active mode, and the control circuit 12 sends a control signal to the monitoring circuit 19 to begin monitoring usage of the set-top-box 1.

Figure 3:
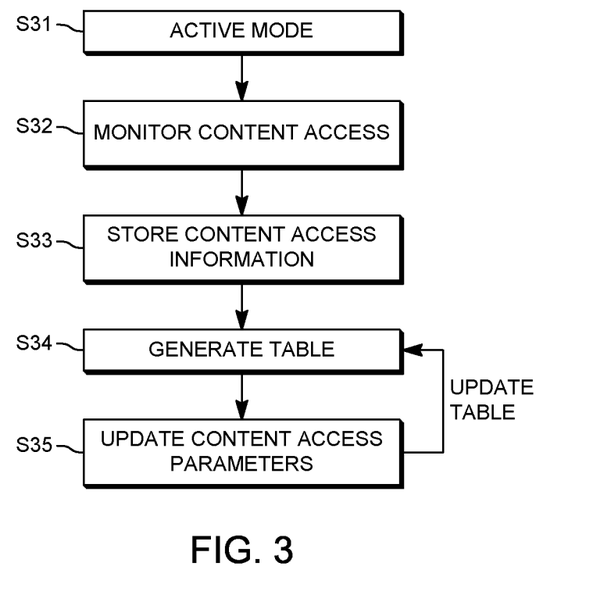
FIG. 3 is a flow chart of an algorithm implemented by the electronic apparatus for monitoring access to content.

FIG. 3 is a flowchart of an example of the Active mode.

In step S31, it has been determined that the current mode is the Active mode.

In step S32, the monitoring circuit 19 monitors usage of the set-top-box 1. The monitoring circuit 19 monitors content access by the user, wherein content access includes, for example, tuning to a particular channel and using certain services, such as VOD and the like, provided by the set-top-box 1. The monitoring circuit 19 acquires data, in the form of content access information, pertaining to the access to the content. The content access information includes content access parameters (e.g., time data, day of the week data, data on channel/service identification information, and so on and so forth).

Information from the EPG of the set-top-box 1 can be used in conjunction with the acquired content access information to supplement and/or verify the content access information. The acquired content access information can also be cross-referenced with information in the EPG or other programming information (e.g., an online database) so as to improve accuracy of the content access information.

In step S33, the control circuit 12 causes storage of the content access information acquired from the monitoring, by the monitoring circuit 19, of the user's access to content. For example, using bus lines 110, the control circuit 12 communicates with RAM 13, thereby initiating and causing storage of the content access information in RAM 13 (although any memory of the set-top-box 1 can be used to store the information).

The content access information includes information pertaining to when a user watches a certain program (i.e., the watching habit(s) of a user). Included in the content access information are content access parameters such as start times, end times, channel/service identification information, and total time duration (e.g., in minutes viewed) of a channel/service. The start times can include a start time of a program according to information in the EPG, or the start of the Active mode. Similarly, the end times can be an end time of a program according to information in the EPG, or the end of the Active mode.

In step S34, a table is generated by the monitoring circuit 19. The acquired content access information is extrapolated and accumulated into the table that is stored, for example, in RAM 13. The table is generated in a channel service database of the set-top-box 1, and serves to count, for example, a total duration that a particular channel is watched on a particular day or span of days. However, the table can include other cumulative information such as frequency of access and the like.

In step S35, data of the content access parameters is constantly updated as the user uses the set-top-box 1 in the Active mode, and the table is updated accordingly. Because the monitoring circuit 19 monitors usage during the Active mode, new content access information is constantly acquired in the Active mode, and watching habits of the user can effectively be learned.

Figure 4:
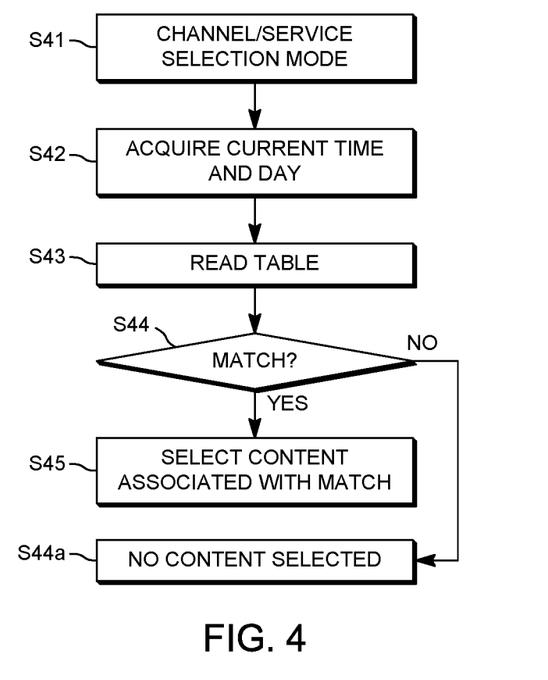
FIG. 4 is a flow chart of an algorithm implemented by the electronic apparatus for selecting a channel and/or service provided by the electronic apparatus.

FIG. 4 is a flowchart of an example of a channel/service selection mode that runs, for example, upon the initial determination that the Active mode is the current operation mode. That is, at the beginning of a current active usage of the set-top-box 1, once it has been determined that the set-top-box 1 is powered on and the television 2 is powered on (i.e., the Active mode is the current mode), the control circuit 12 will initiate the channel/service selection mode.

In step S41, it has been determined that the current operation mode is the Active mode, and thus the channel/service selection mode is initiated by the control circuit 12.

In step S42, the control circuit 12 acquires data in the form of access parameters of the current Active mode. The access parameters include data relating to the current time and day. For example, in determining and acquiring the current time and day, the control circuit 12 refers to internal time and date settings of the set-top-box 1, or acquires such time and date information from the internet, via the first radio 15.

In step S43, the control circuit 12 reads the content access information stored in the table. This information is the updated content access information representing the latest user watching habits.

In step S44, the control circuit 12 compares the access parameters (e.g., the current time and day information) of the Active mode with the content access information read from the table, and compares the two sets of information to determine if there is a match, for example, between the current time and day and a time and day stored in the table.

That is, the access parameters of the Active mode are determined by the control circuit 12 to match the updated content access parameters when a time at which the control circuit 12 determines that the current operation mode is the Active mode overlaps with or is otherwise similar to the start time of the access to the content, and a day of the week associated with the time at which the control circuit 12 determines that the current operation mode is the Active mode is the same as the day of the week of the access to the content.

In step S44a, if the control circuit 12 determines that there is no matching data between the access parameters of the Active mode and the content access parameters in the table, the channel/service selection mode is terminated. That is, no content is output, as no channel has been selected (i.e., there is no channel that has been determined to be a favorite channel based on the user's watching habits).

In step S45, if the control circuit 12 determines that there is matching data between the time and day parameters included in the access parameters of the Active mode and the time and day parameters included in the content access parameters of the table, the channel (or service) that is associated with the matching information in the table is selected, and the content of that channel is output for display (or, for example, the service associated with matching information is launched). That is, in the case of selecting a channel associated with the matching information, the control circuit 12 sends a control signal, using bus lines 110, to tuner 17, so as to tune to the selected channel. The A/V decoder 18 then decodes the signal of the selected channel. The content of the selected channel is to be displayed, for example, on television 2, and is considered current content of the content accessible through the set-top-box 1.

Figure 5:
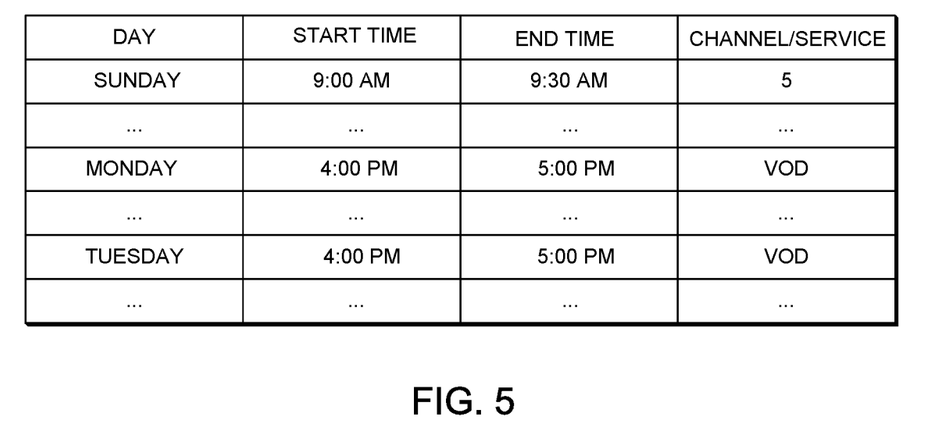
FIG. 5 is a table illustrating watching habits of a user.

FIG. 5 represents an example of a user's watching habits. For example, the user can watch channel 5 from 9:00 AM to 9:30 AM on Sunday, and then from 4:00 PM to 5:00 PM on each of Monday and Tuesday, use a VOD service of the set-top-box 1 for access to content provided through the VOD service. The monitoring circuit 19 monitors and acquires data pertaining to the user's watching habits. Such data is stored in a memory of the set-top-box 1.

Acquired content access parameters are then used to generate a table in the channel service database of the set-top-box 1 to determine, for example, a favorite channel and/or service of the user. The table can be referred to as a favorites table. A channel is determined to be a favorite channel based, for example, on a count of the total duration that the channel is watched. However, determination of a favorite channel can be based on other characteristics of the acquired content access information, such as frequency of tuning and the like.

In a scenario where the set-top-box 1 has been newly installed, the set-top-box 1 will begin monitoring the usage of the set-top-box 1 upon a first usage of the set-top-box 1. Alternatively, the user can first be asked or prompted by the set-top-box 1 if they would like to allow for monitoring of their usage to enable the favorite channel feature of the set-top-box 1.

In one usage example, on Sunday, the user only watches television from 9:00 AM to 9:30 AM. At the beginning of the monitoring of the usage by the set-top-box 1 (e.g., on a first Sunday following the start of the monitoring of the usage), the monitoring circuit 19 acquires information that the user watched channel 5 from 9:00 AM to 9:30 AM.

However, while watching television, the user may tune to a particular channel to watch a desired program, but tune to a different channel periodically during the run-time of the desired program (e.g., during a commercial break). The user however tunes back to the channel with the desired program after the commercial break has ended.

Figure 6A:
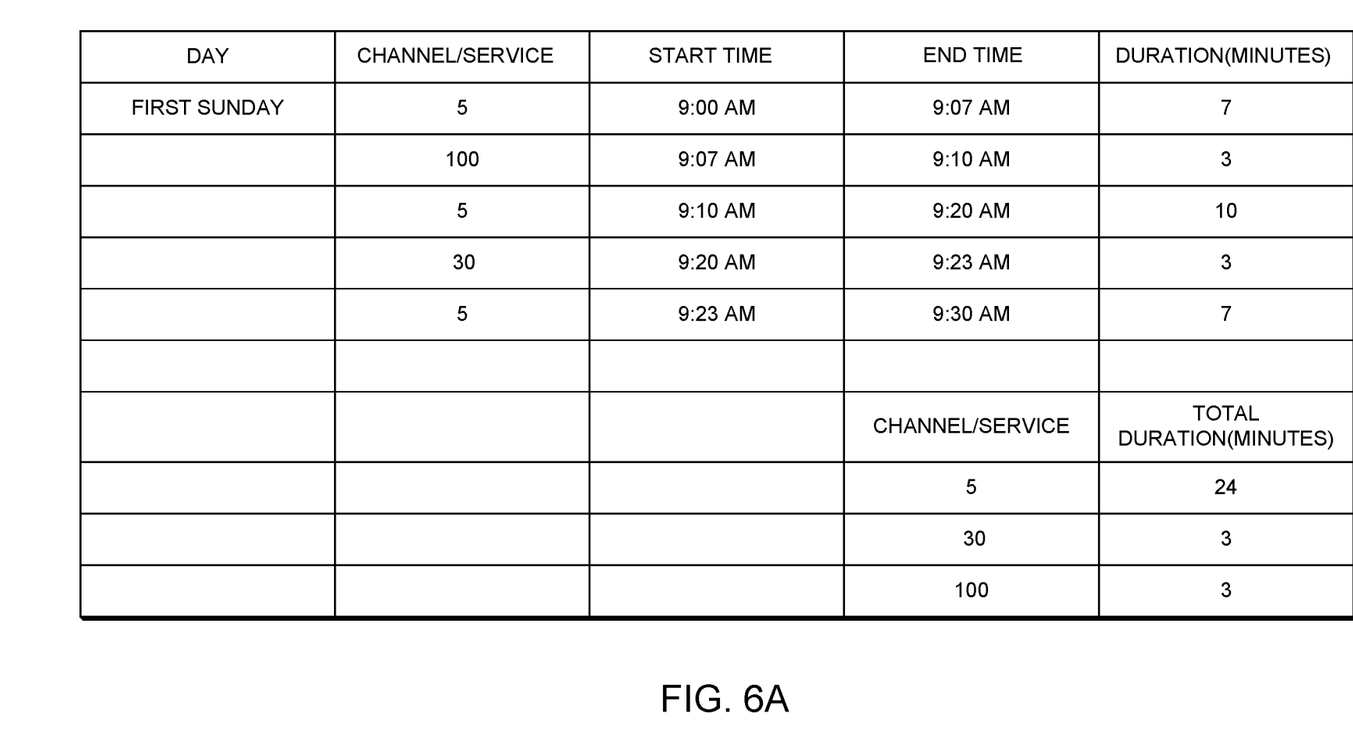
FIG. 6A is a table illustrating acquired content access information.

FIG. 6A represents an example of the content access information acquired during the first Sunday. The user tunes to channel 5 at 9:00 AM, but tunes to channel 100 when channel 5 goes to a commercial at 9:07 AM. The user then tunes back to channel 5 at 9:10 AM (e.g., under the assumption the commercials on channel 5 have finished). The user then watches channel 5 from 9:10 AM to 9:20 AM, but tunes to channel 30 at 9:20 AM when channel 5 again airs commercials. The user then tunes back to channel 5 at 9:23 AM, until the end of the desired program at 9:30 AM. As the desired program has ended, the user then turns one or both of the set-top-box 1 and the television 2 off, ending the Active mode, and thereby ending monitoring by the monitoring circuit 19.

The favorites table is then updated to store the data of the content access information relating to user's usage on the first Sunday from 9:00 AM to 9:30 AM.

The monitoring circuit 19, for example, determines that the total duration time that the user watched channel 5 on the first Sunday is 24 minutes, with the other 6 minutes of the overall 30 minute duration being spread between channels 30 and 100.

Figure 6B:
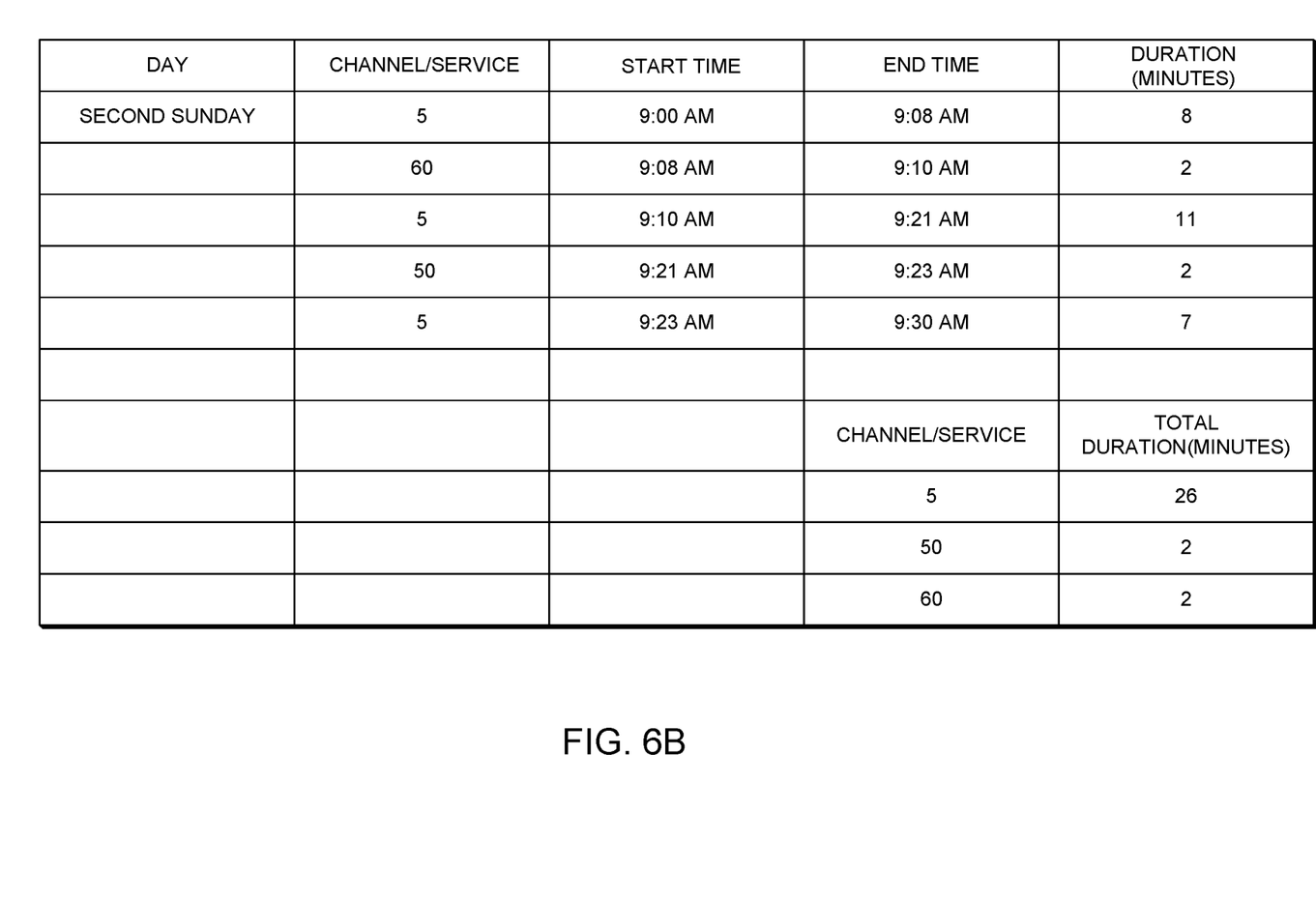
FIG. 6B is a table illustrating additional acquired content access information.

On a second Sunday, the user again watches channel 5 from 9:00 AM to 9:30 AM. FIG. 6B represents an example of the content access information acquired from monitoring usage during the second Sunday. The user tunes to channel 5 at 9:00 AM, but tunes to channel 60 when channel 5 goes to a commercial at 9:08 AM. The user then tunes back to channel 5 at 9:10 AM (e.g., under the assumption the commercials on channel 5 have finished). The user then watches channel 5 from 9:10 AM to 9:21 AM, but tunes to channel 50 at 9:21 AM when channel 5 again airs commercials. The user then tunes back to channel 5 at 9:23 AM, until the end of the desired program at 9:30 AM. As the desired program has ended, the user then turns one or both of the set-top-box 1 and the television off, ending the Active mode, and thereby ending monitoring by the monitoring circuit 19.

The total duration time that the user watched channel 5 on the second Sunday is 26 minutes, with the other 4 minutes of the overall 30 minute duration being spread between channels 50 and 60.

Figure 6C:
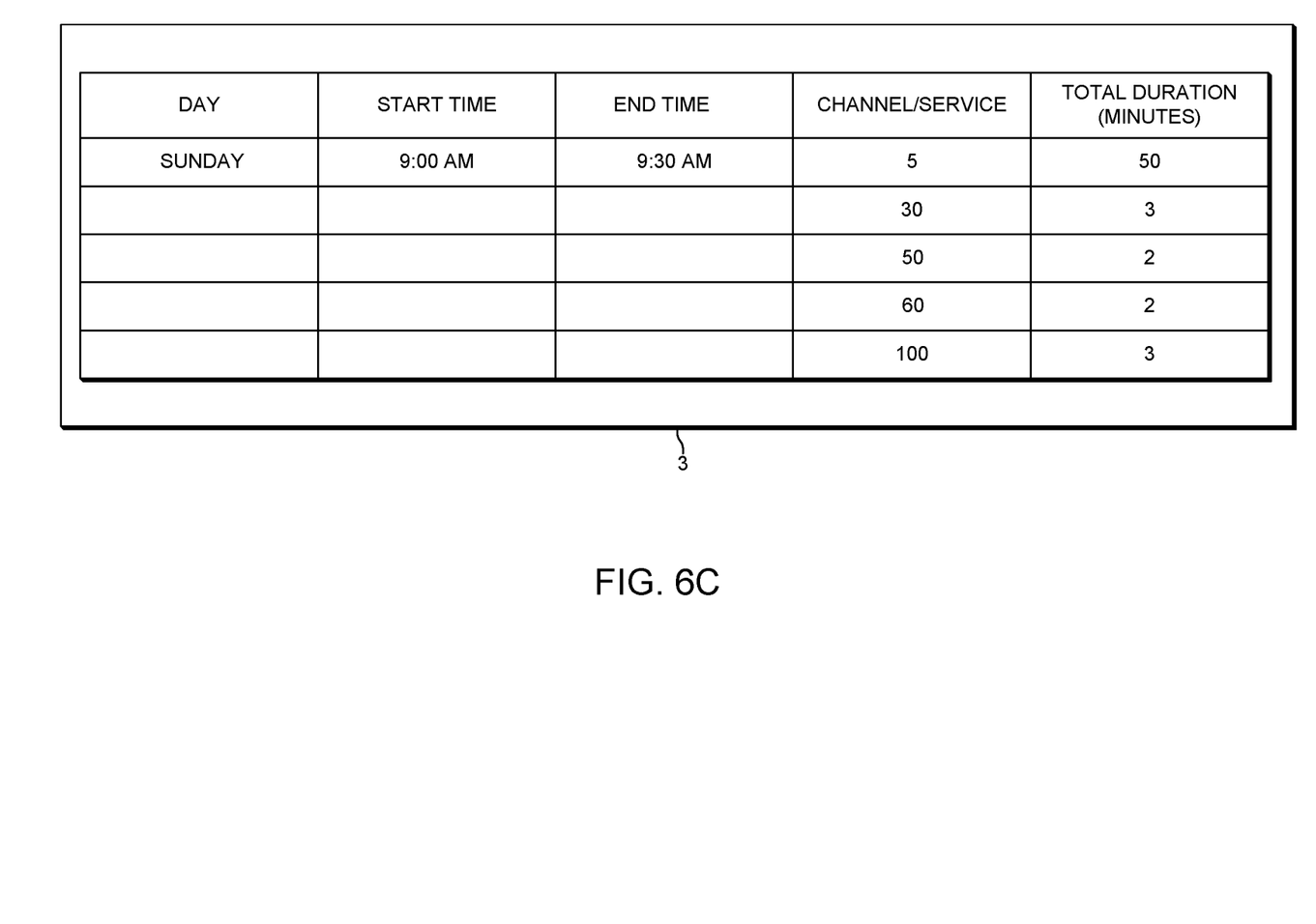
FIG. 6C is a table illustrating a table stored in a channel service database of the electronic apparatus.

FIG. 6C represents an example of the favorites table, stored in a channel service database 3 of the set-top-box 1. The favorites table has been populated with the information shown in FIGS. 6A and 6B. Based on the information acquired from the first Sunday and the second Sunday, from 9:00 AM to 9:30 AM on each the first and second Sunday, the user watched channel 5 for 50 minutes (out of a possible 60 minute span), and watched other channels (e.g., channels 30, 50, 60 and 100) for a combined 10 minutes (out of the total 60 minute span). Thus, it is determined that the user prefers to watch channel 5 at 9:00 AM to 9:30 AM on Sunday.

On the third Sunday (i.e., after the usage monitoring feature of the set-top-box 1 has been activated), when the user turns on the television 2 connected to the set-top-box 1 at 9:00 AM, the Active mode is determined in the manner as shown in FIG. 2, and the channel/service selection mode of FIG. 4 is activated.

In the channel/service selection mode, the current time (in this case 9:00 AM) and day (in this case Sunday) is compared to the information stored in the favorites table. In the example relating to FIG. 6C, based on the match between the current time (9:00 AM) and day (Sunday), the set-top-box 1, by way of the channel/service selection mode, selects channel 5 and automatically tunes to channel 5, since the set-top-box 1 has learned that the user prefers to watch channel 5 at 9:00 AM on Sunday. As such, the user does not have to manually tune to channel 5. Meanwhile, the Active mode as shown in FIG. 3 continues, such that new content access information is acquired and the favorites table is updated accordingly. As such, the set-top-box 1 is constantly learning the user's watching habits during the Active mode, resulting in more accurate detection of a user's favorite channels and services.

The data of the content access parameters is updated as new content access information is acquired during continued (e.g., daily) use of the set-top-box 1, so that the favorites table is constantly updated and contains data reflecting the most recent watching habits of the user. The favorites table, in a preferred embodiment, stores an accumulated total of the duration that a channel is watched or a service is used.

With prior art devices, a situation such as turning on the television to watch a desired channel would require some type of user input, such as the user pressing a button on the set-top-box or pressing a button on a remote control of the set-top-box 1, in order to tune to the desired channel or start a desired service such as VOD. However, since the control circuit 12 refers to the favorites table (stored in the channel service database 3 of the set-top-box 1) which stores content access information based on watching habits of the user over time, the control circuit 12 is able to cause tuning of the set-top-box 1 to the channel that the user normally watches, or automatically start and/or navigate to content within a service such as VOD.

The set-top-box 1 is not limited to tuning to a favorite channel based on the time and day information in the favorites table, but can also, for example, launch a favorite application such as Netflix®, if the information in the favorites table indicates that Netflix® is normally used at a particular time on a particular day.

By comparing, for example, a time and day of a current usage to the content access information stored in the favorites table, upon turning on of the television 2 connected to the set-top-box 1 at a current usage, the set-top-box 1 will default (i.e., automatically tune) to a channel or service that has been determined to be normally viewed by the user at that time of day, otherwise known as a favorite channel or service, thereby increasing end user convenience. However, the present invention is not limited merely to using time and date information. Other acquired information can be used to determine a user's favorite channel/service.

The present invention provides user convenience by automatically tuning to a channel or opening a service that is normally viewed/used at a particular time on a particular day, after learning the user's watching habits through monitoring of the user's access to content on the set-top-box.

As mentioned above, various components shown in FIG. 1 can be included or omitted in each of the plural electronic apparatuses. For example, in the example above, the set-top-box 1 can be a set-top-box configured to omit the input/output circuit and the tuner, in which case the set-top-box would be of a wireless only IPTV configuration with no wired connection to the gateway apparatus, such as a modem or other set-top-box, and no wired connection to the user display device, such as a television. In such a case, all content and data is communicated wirelessly via the first and second radios. Alternatively, components such as the tuner and input/output circuit can be retained, but their functions not utilized in a wireless only IPTV implementation.

The present invention can be implemented not only as an apparatus or apparatuses, but also as a method including the steps conducted by the electronic devices as discussed above, which methods as discussed above constitute examples of algorithms. The invention can also be implemented as a program on a non-transitory computer-readable recording medium for causing a computer, such as a processor in an electronic apparatus, to execute such steps. The non-transitory computer-readable recording medium could be, for example, a CD-ROM, DVD, Blu-ray Disc™, or an electronic memory device.

The present invention may be implemented as any combination of a system, a method, an integrated circuit, and a computer program on a non-transitory computer readable recording medium.

The present invention is not limited to the above-described operation modes. Modes can be changed or removed, and additional modes can be added, all being within the scope of the present invention.

The control circuit and any other parts of the electronic apparatuses may be implemented as Integrated Circuits (IC), Application-Specific Integrated Circuits (ASIC), or Large Scale Integrated circuits (LSI), system LSI, super LSI, or ultra LSI components which perform a part or all of the functions of the electronic apparatuses, such as set-top-boxes. Each of the parts of the present invention can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated.

Moreover, steps, or parts of the algorithm, may be implemented simultaneously or in parallel.

The components of the present invention can be in the form of a set-top-box box as in the exemplary embodiments disclosed above, or in other standalone devices, or may be incorporated in a television or other content playing apparatus, or other device or appliance, and the scope of the present invention is not intended to be limited on such forms.

It is also contemplated that the implementation of the components of the present invention can be done with any newly arising technology that may replace any of the above implementation technologies.

We claim:

1. An electronic apparatus for selecting content, and for use with a display device to be connected to the electronic apparatus, the electronic apparatus comprising:
    a control circuit that controls access to content provided by the electronic apparatus, determines an operation mode of the electronic apparatus, and determines a power-on state of the display device;
    a monitoring circuit that:
       monitors the access to the content;
       acquires content access information associated with (i) the content and (ii) the access to the content; and
       generates a table, the table including content access parameters of the content access information, the content access parameters including a current time, and a current day of the week associated with content that is viewed; and
    a non-transitory computer-readable recording medium, wherein
    the control circuit causes each of the content access information acquired by the monitoring circuit and the table generated by the monitoring circuit to be stored in the non-transitory computer-readable recording medium,
    the monitoring circuit updates the content access parameters in the table as additional content access information is acquired by the monitoring circuit, and
    when the control circuit determines that a current operation mode of the electronic apparatus is a current active mode by determining that both the electronic apparatus and the display device are powered on, the control circuit: acquires current content access parameters of current content associated with the current active mode of the electronic apparatus, the current content having the current time, and the current day of the week, refers to the table and selects, when the current time, and the current day of the week of the current access parameters for the current content associated with the current active mode of the electronic apparatus are determined by the control circuit to match an entry of content in the table having the updated content access parameters that includes the current time, and the current day of the week, the content associated with the entry in the table having the updated content access parameters that includes the current time and the current day of the week to be output from the electronic apparatus, wherein the content associated with the entry in the table having the updated content access parameters is associated with the current time, and the current day of the week.

2. The electronic apparatus according to claim 1, wherein the current content includes at least one of:
    content broadcast on a broadcast channel;
    content provided through an over-the-top service;
    content provided through a pay-per-view service; and
    content provided through a video-on-demand service.

3. The electronic apparatus according to claim 2, wherein the broadcast channel includes a plurality of channels, and the plurality of channels includes at least one of over-the-air broadcast channels and channels provided by a content provider.

4. The electronic apparatus according to claim 3, wherein the monitoring circuit calculates the total access duration of access to each of the plurality of channels,
    the control circuit causes the total access durations calculated by the monitoring circuit to be stored in the table, and
    the control circuit selects a channel of the plurality of channels that has a longest total access duration among the total access durations calculated by the monitoring circuit stored in the table, to output content of the selected channel as the current content.

5. The electronic apparatus according to claim 2, wherein the monitoring circuit does not operate if the operation mode of the electronic apparatus is determined by the control circuit to be one of:
    an off mode different from the active mode;
    an inactive mode different from each of the active mode and the off mode; and
    an other input mode different from each of the active mode, the off mode, and the inactive mode.

6. The electronic apparatus according to claim 1, wherein the current content access parameters of the active mode of the electronic apparatus are determined by the control circuit to match the updated content access parameters when (i) a time at which the control circuit determines that the current operation mode is the current active mode overlaps with the start time of the content access parameters, and (ii) a day of the week associated with the time at which the control circuit determines that the current operation mode is the current active mode is the same as the day of the week associated with the content access parameters.

7. A method for selecting content in an electronic apparatus, the method being for use with a display device to be connected to the electronic apparatus, said method comprising:
    determining access to content provided by the electronic apparatus;
    determining an operation mode of the electronic apparatus;
    determining a power on state of the display device;
    monitoring the access to the content;
    acquiring content access information associated with (i) the content and (ii) the access to the content;
    generating a table, the table including content access parameters of the content access information, the content access parameters including a current time, and a current day of the week associated with content that is viewed;
    storing, in a non-transitory computer-readable recording medium of the electronic apparatus, the acquired content access information and the generated table;
    updating the content access parameters in the table as additional content access information is acquired; and
    when, in the determining the current operation mode of the electronic apparatus, a current operation mode is determined to be a current active mode of the electronic apparatus by determining that both the electronic apparatus and the display device are powered on: acquiring current content access parameters of current content associated with the current active mode of the electronic apparatus, the current content having the current time, and the current day of the week; referring to the table; determining if the current time, and the current day of the week of the current access parameters for the current content associated with the current active mode of the electronic apparatus match the entry of content in the table having the updated content access parameters that includes the current time and the current day of the week; and selecting, when a match is determined in the determining if the current time, and the current day of the week of the current access parameters for the current content associated with the current active mode match the entry of the content in the table having the updated content access parameters that includes the current time and the current day of the week, the content associated with the entry in the table having the updated content access parameters that includes the current time and the current day of the week to be output from the electronic apparatus, wherein the content associated with the entry in the table having the updated content access parameters is associated with the current time, and the current day of the week.

8. The method according to claim 7, wherein the current content includes at least one of:
content broadcast on a broadcast channel;
content provided through an over-the-top service;
content provided through a pay-per-view service; and
content provided through a video-on-demand service.

9. The method according to claim 8, wherein the broadcast channel includes a plurality of channels, and the plurality of channels includes at least one of over-the-air broadcast channels and channels provided by a content provider.

10. The method according to claim 9, further comprising:
calculating the total access duration of access to each of the plurality of channels;
storing, in the table, the total access durations;
selecting a channel of the plurality of channels that has a longest total access duration among the total access durations stored in the table; and
outputting content of the selected channel as the current content.

11. The method according to claim 8, wherein the monitoring the access to the content does not occur if the operation mode of the electronic apparatus is determined to be one of:
an off mode different from the active mode;
an inactive mode different from each of the active mode and the off mode; and
an other input mode different from each of the active mode, the off mode, and the inactive mode.

12. The method according to claim 7, wherein the current content access parameters of the active mode of the electronic apparatus are determined to match when (i) a time at which the current operation mode is determined to be the current active mode overlaps with the start time of the content access parameters, and (ii) a day of the week associated with the time at which the current operation mode is determined to be the active mode is the same as the day of the week associated with the content access parameters.

13. A non-transitory computer readable storage medium having stored thereon a program for instructing a computer to implement a method for selecting content in an electronic apparatus, and for use with a display device to be connected to the electronic apparatus, said method comprising:
determining access to content provided by the electronic apparatus;
determining an operation mode of the electronic apparatus;
determining a power on state of the display device;
monitoring the access to the content;
acquiring content access information associated with (i) the content and (ii) the access to the content;
generating a table, the table including content access parameters of the content access information, the content access parameters including a current time, and a current day of the week associated with content that is viewed;
storing, in a non-transitory computer-readable memory of the electronic apparatus, the acquired content access information and the generated table;
updating the content access parameters in the table as additional content access information is acquired; and
when, in the determining the current operation mode of the electronic apparatus, a current operation mode is determined to be a current active mode of the electronic apparatus by determining that both the electronic apparatus and the display device are powered on: acquiring current content access parameters of current content associated with the current active mode of the electronic apparatus, the current content having the current time, and the current day of the week; referring to the table; determining if the current time, and the current day of the week of the current access parameters for the current content associated with the current active mode match an entry of content in the table having the updated content access parameters that includes the current time, and the current day of the week; and selecting, when a match is determined in the determining if the current time, and the current day of the week of the current content associated with the current access parameters for the current content associated with the current active mode of the electronic apparatus match the entry of content in the table having the updated content access parameters that includes the current time, and the current day of the week, the content associated with the entry in the table having the updated content access parameters that includes the current time and the current day of the week to be output from the electronic apparatus, wherein the content associated with the entry in the table having the updated content access parameters is associated with the current time, and the current day of the week.

14. The non-transitory computer readable storage medium according to claim 13, wherein the current content includes at least one of:
content broadcast on a broadcast channel;
content provided through an over-the-top service;
content provided through a pay-per-view service; and
content provided through a video-on-demand service.

15. The non-transitory computer readable storage medium according to claim 14, wherein the broadcast channel includes a plurality of channels, and the plurality of channels includes at least one of over-the-air broadcast channels and channels provided by a content provider.

16. The non-transitory computer readable storage medium according to claim 15, said method further comprising:
calculating the total access duration of access to each of the plurality of channels;
storing, in the table, the total access durations;
selecting a channel of the plurality of channels that has a longest total access duration among the total access durations stored in the table; and outputting content of the selected channel as the current content.

17. The non-transitory computer readable storage medium according to claim 14, wherein the monitoring the access to the content does not occur if the operation mode of the electronic apparatus is determined to be one of:
- an off mode different from the active mode;
- an inactive mode different from each of the active mode and the off mode; and
- an other input mode different from each of the active mode, the off mode, and the inactive mode.

18. The non-transitory computer readable storage medium according to claim 13, wherein the current content access parameters of the active mode of the electronic apparatus are determined to match when (i) a time at which the current operation mode is determined to be the current active mode overlaps with the start time of the content access parameters, and (ii) a day of the week associated with the time at which the current operation mode is determined to be the current active mode is the same as the day of the week associated with the content access parameters.

* * * * *